United States Patent [19]

Gillespie

[11] E Re. 30,097

[45] Reissued Sep. 18, 1979

[54] CONTROL INJECTION SYSTEM FOR DRYCLEANING APPARATUS IN SYSTEMS

[75] Inventor: Robert A. Gillespie, Skaneateles, N.Y.

[73] Assignee: Stauffer Chemical Company, Westport, Conn.

[21] Appl. No.: 824,013

[22] Filed: Aug. 12, 1977

Related U.S. Patent Documents

Reissue of:

[64] Patent No.: 3,653,234
Issued: Apr. 4, 1972
Appl. No.: 87,138
Filed: Nov. 5, 1970

[51] Int. Cl.[2] ..... D06F 39/02; D06F 43/00; D06F 33/02

[52] U.S. Cl. ..... 68/12 R; 68/13 R; 68/17 R; 68/207; 222/70

[58] Field of Search ..... 68/12 R, 13 R, 17 R, 68/207; 134/57 R, 57 D, 58 R, 58 D, 95; 222/70

[56] References Cited

U.S. PATENT DOCUMENTS

| | | | |
|---|---|---|---|
| 3,018,922 | 1/1962 | Williamson | 68/17 R X |
| 3,093,442 | 6/1963 | Brown et al. | 68/13 R X |
| 3,376,720 | 4/1968 | Hartshorn et al. | 68/12 R |

OTHER PUBLICATIONS

Ferber Associates, "Maintenance and Operation Manual RAMC" and operation description thereof, 1968 (date sold to Far-Best Corporation).

*Primary Examiner*—Philip R. Coe
*Attorney, Agent, or Firm*—Michael E. Zall

[57] ABSTRACT

This invention provides a control injection system for adding a chemical and/or water from a metering device to a programmed drycleaning machine for a predetermined time interval. The control injection system comprises an automatic reset electrical timer having a dial which is setable for the predetermined time interval, a load terminal in communication with one or more metering devices, and receiving and relaying means for receiving a signal from the programmer of the drycleaning machine and relaying the signal to start the timer and energize the load terminal to actuate the metering devices to admit the chemical and/or water into the drycleaning machine for the time interval set on the timer. The timer being arranged to de-energize the load terminal at the end of the time interval independent of the length of the signal from the programmer.

8 Claims, 2 Drawing Figures

CONTROL INJECTION SYSTEM FOR DRYCLEANING APPARATUS IN SYSTEMS

Figure 1:
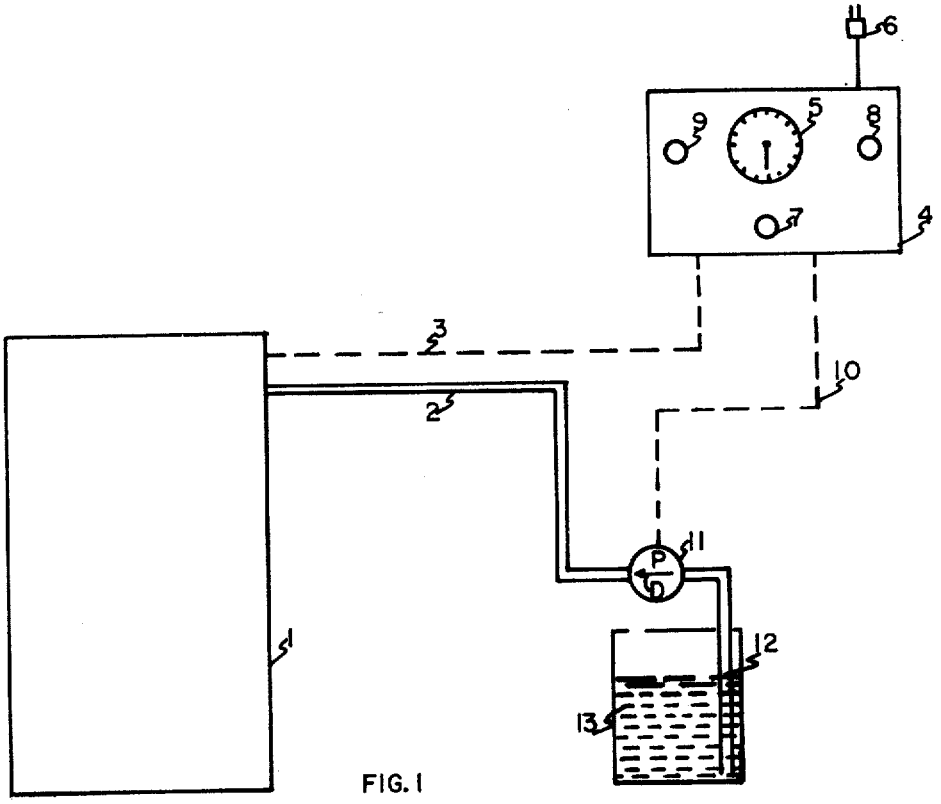

Matter enclosed in heavy brackets [ ] appears in the original patent but forms no part of this reissue specification; matter printed in italics indicates the additions made by reissue.

BACKGROUND OF THE INVENTION

The drycleaning process has long been used to clean garments by the use of an organic type solvent The technology of the drycleaning process has improved to the point where machines and apparatus can be purchased with programmers that will control the process from initial cleaning stage through the end of the drying stage. Such functions as solvent let down to the wash wheel, cleaning by batching, cleaning on a filter, solvent level control, solvent pump out to storage tanks or to stills, filter regeneration, clean solvent rinse, extraction, drying, deodorizing and so forth, are frequently programmed on these machines so that the operator merely chooses the correct program for the type of garment or fabric to be cleaned and places the program in the drycleaning programmer and the drycleaning machine cleans and dries the garments.

It is well known in the drycleaning industry that certain additives to the solvent assist the cleaning process and impart other desirable properties to the clean garments. The problem that arises in the use of these additives is that frequently they are expensive and so careful metering of these additives is necessary to prevent excessive costs in using them. Other additives, e.g., water, while not expensive, must be added in carefully controlled amounts to prevent damage to the garments being cleaned. These additives must be added to the drycleaning process at the precise time in order for them to accomplish their intended purpose.

There is a problem with the programmers that are used on drycleaning machines in which the process is controlled by a card or a plastic tab. These cards or tabs have 11 or more tracks with each track controlling one or more functions on the drycleaning machine. The method by which these cards or tabs operate is as described below.

The card or tab is placed in a slot where a mechanical drive mechanism moves it at a constant rate through a sensing area where sensors on each track detect holes (in the case of cards) or depressions (in the case of tabs) which actuates switches to control the functions on a drycleaning machine. The time each function operates is determined by the length of the hole or depression. These cards or tabs are usually cut by hand by the person setting up the process. It is difficult to cut these to an accuracy of greater than plus or minus, 15 seconds, to control a particular function. In practically all cases, the programmers on these drycleaning machines are difficult to control to the precise accuracy necessary to give the exact metering of additives necessary if the metering is done by a constant volume per unit of time. This operation generally calls for an accuracy of plus or minus 1 second.

There is another problem which frequently arises on these programmed machines due to the fact that there are not sufficient spare tracks on the programmer control card or tabs so that the particular chemical can be called for on a separate track. In this case, the track is chosen in which an event is called for at the same time as is necessary to add the additive. This could be the opening of a particular valve, starting of a motor, or closing of a valve or some other event. The requirements of the process could be that this particular event chosen is of longer or shorter duration, due to its process purpose, than the time requirements of the additive feeder at the rate it meters to the drycleaning process.

Because of these problems with the use of the existing programmers on drycleaning machines, it is necessary to have a separate controller to meter in additives to the drycleaning process. This controller, upon receiving a signal from the drycleaner programmer would control devices to meter additives for a predetermined length of time that would be virtually independent of the length of signal that activates it.

Accordingly, an important object of the present invention is to provide a control injecting system which will upon receiving a signal from the drycleaning programmer, and independent of the length of the signal, provide chemicals and/or water to the drycleaning machine for a predetermined time interval.

The present invention provides such a control injecting system by having a circuit in which there is an automatic reset electrical timer having a dial which may be set for the desired time interval during which the chemical and/or water is to be added to the drycleaning machine. In conjuction with the timer, the control circuit has receiving means or a pair of terminals for receiving the signal from the programmer of the drycleaning machine, which activates the timer by relay means or switches and contacts, energizes a metering device to which the control circuit is in communication by load terminals to provide chemicals and/or water to the drycleaning machine for the predetermined time interval.

The invention, together with further objects, features and advantages thereof will be more clearly understood by reference to the following detailed specification taken in conjunction with the accompanying drawings which illustrate a preferred embodiment.

Figure 2:
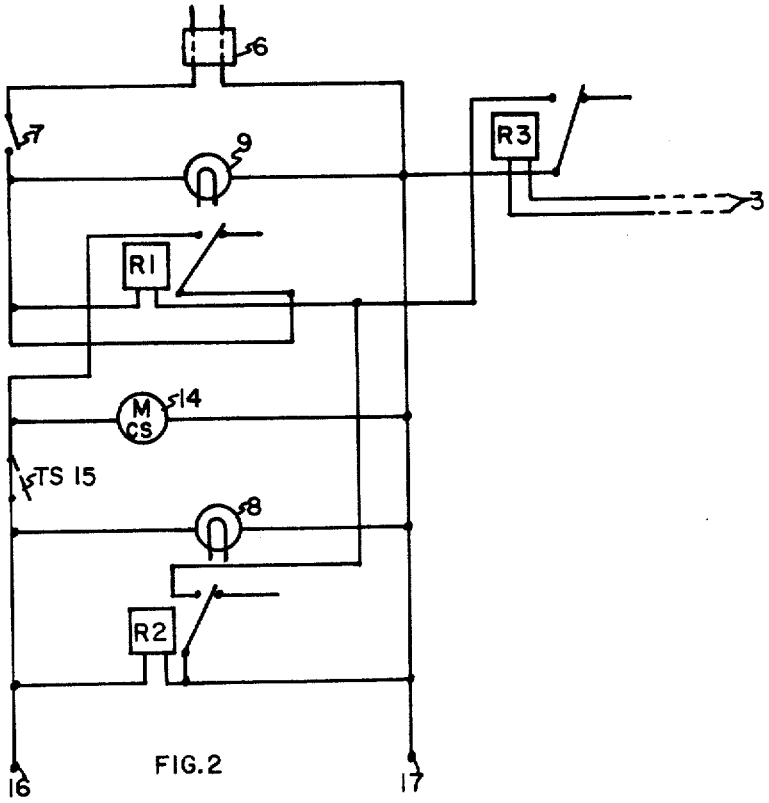

In the drawings:

FIG. 1 is a schematic representation of a drycleaning machine; chemical or water sources; and injection control system of the present invention; and FIG. 2 is a schematic diagram of the electrical circuit of the controller of the injection system of the present invention.

Referring to FIG. 1, there is shown in representative form a drycleaning machine 1, an injection controller 4, a constant volume pump 11, and a reservoir of material 13 to be injected, together with associated conduit and electrical means. The injection controller 4 includes a timer 5, an "on-off" switch 7, an active light, and an "on" light 9. The injection controller 4 receives electrical power from an external source through a plug 6, and is in direct communication with the drycleaning programmer by means of line 3. When the off-on switch 7 of the injection controller 4 is in the "on" position, the "on" light 9 of the injection controller 4 indicates that the injection controller 4 is ready to receive a signal from the drycleaning programmer by line 3. When a signal is received from the drycleaning programmer by means of line 3, the active light 8 indicates that the timer 5 is in control of pump 11 and will cause pump 11 to pump material from the reservoir 13 by means of a conduit 12, and through another conduit 2 into the drycleaning machine 1. In some cases it may be necessary to inject more than one chemical and/or water at the same time. When this is necessary, pump 11 as well as other devices to meter materials can be operated by means of power through line 10 at the same time for the power to operate pump 11 is supplied through plug 6, and not the signal on line 3.

Referring to FIG. 2, the circuit of the injection controller shown therein, consists of an "off-on" switch 7, an "on" light 9, relays R1, R2, and R3, an active light 8, an automatic reset timer 14 containing a constant speed electric motor and a normally closed timer switch TS15, and load contacts 16 and 17. The coil of relay R3 is chosen to match the voltage of the drycleaning machine programmer. When the off-on switch 7 is closed, the on light 9 indicates the injection controller is "on" and ready to receive a signal from the drycleaning programmer. When a signal is received on line 3 from the drycleaning programmer, the coil of relay R3 is energized applying power to the coil of relay R1 which in turn applies power to the constant speed motor of the automatic reset timer 14, the "active" light 8, the coil of relay R2 and the load contacts 16 and 17 through normally closed timer switch TS15. One or more metering devices can be operated from the load contacts 16 and 17. The metering devices continue to operate until the constant speed motor of the automatic reset timer 14 causes the timer switch TS15 to open and thereby opens the circuit, and deactivates the "active" light 8, the coil of relay R2, and load contacts 16 and 17. This circuit is designed to actuate metering devices for the preset time on the automatic reset timer independent of the length of the signal received from the drycleaning programmer. This can be shown by considering the three cases of drycleaning programmer signal lengths. These three cases are:

1. The signal is of shorter duration than the time set on the automatic reset timer;

2. The signal is of the same duration as the time set on the automatic reset timer; and 3. The signal is of longer duration than the time set on the automatic reset timer.

The operation of the injection controller circuit in the three cases is as follows:

Case 1

When the signal is of a shorter duration than the time set on the automatic reset timer 14, relay R3 closes and opens before the constant speed motor in the timer 14, opens TS15. When this happens the relay R1 coil is kept energized by the contact of relay R2 and power is maintained on load contacts 16 and 17 until the constant speed motor of the automatic reset timer 14 opens the timer switch TS15, thereby dropping out relay R2 which allows relay R1 to drop out.

2

Virtually the same thing happens in this case as in Case 1, except that relay R3, relay R1 and relay R2 all drop out at the same time.

Case 3

When the signal on line 3 is longer than the time set on the automatic reset timer, relay R3 remains closed after the timer switch TS15 opens. The timer switch TS15 still de-energizes load contacts 16 and 17, "active" light 8, and relay R2. However, relay R1 is still energized which supplies power to the constant speed motor of the automatic reset timer 14. This keeps the timer switch TS15 open. The timer switch TS15 cannot close until power is removed from the constant speed motor of the automatic reset timer 14, by relay R1. Therefor the injection controller circuit waits until the signal on line 3 is lost before it can reset itself.

The control injection system of the present invention as described can add a chemical and/or water for a predetermined time interval regardless of the length of the signal received from the programmer of a drycleaning machine.

The additives which may be added to a drycleaning system by the control injection system include water, drycleaning detergents, drycleaning sizing agents, cleaning agents, deodorizing chemicals, dyeing chemicals, bleaching chemicals, lubricating chemicals, antistatic chemicals, fireproofing chemicals, bactericidal chemicals, pest control chemicals, water proofing chemicals, fungicidal chemicals, oil repellent chemicals, perfuming chemicals, felting chemicals, and textile finishing chemicals.

The control injection system can be used to actuate any type of a device or devices that can meter material at a constant rate. These devices include constant volume pumps, constant pressure sources supplying fluid through a fixed orifice or variable pressure sources supplying a fluid through a variable orifice. Also, gases, solids and liquids could be metered to the drycleaning process by using an appropriate metering device with this control injection system. One controller is needed to meter in one or more materials at a specific time in the drycleaning process. If it is desired to meter additives at different times, a separate controller is required for each different time in the process. Additives can be put into any part of the drycleaning process using this device. For example, they could be fed to the wash wheel, the button trap, or one of the pipes through which a solvent is passed.

This control injection system can be used to add a chemical and/or water to the drycleaning process for cleaning any type of material. For example, the control system can be used to clean 65 percent polyester and 35 percent cotton permanent press, wash and wear garments. In this case, the control system may be used with a Permac drycleaning machine with a capacity of 40 or more pounds of garments. With a capacity of 40 pounds, the proper mixture of the additives is about 10 parts of water to 1 part of chemical agent, e.g., a drycleaning detergent. This mixture is added to the second bath of the process for a period of 2 minutes. The amount of the mixture, e.g., could be determined to be 2 fluid ounces per pound of garments making a total of 80 fluid ounces of the mixture required for the drycleaning process.

Then, by knowing the rate of the metering device, e.g., 40 ounces per minute, the timer can be set for a time interval of 2 minutes to inject the water-detergent mixture into the drycleaning apparatus. The mixture is added upon receipt of a signal from the programmer of the drycleaning machine.

It is to be understood that the specific disclosure of the present control injection system is not intended to be restrictive or confining and that various rearrangements of parts and modifications of design may be resorted to without departing from the scope or spirit of the invention as herein claimed.

What is claimed is:

1. An automatic control injection system for adding a chemical and/or water from a metering device to a programmed drycleaning machine for a predetermined time interval, said injection system comprises an electrical circuit which includes an automatic reset timer settable for the predetermined time interval, a load contact adapted to be connected to said metering device, and receiving and relaying means for receiving a signal from the programmer of the drycleaning machine and relaying the signal to start the timer and energize the load contact to actuate the metering device to emit the chemical and/or water into the drycleaning machine for the time interval set on the automatic reset timer.

2. An automatic control injection system according to claim 1, wherein the automatic reset timer is arranged in said circuit to de-energize the load terminal at the end of the predetermined time interval independent of the signal time length received from the programmer of said drycleaning machine.

3. An automatic control injection system according to claim 1, wherein the length of the signal received from the drycleaning programmer is shorter than the time interval set on the timer.

4. A control injection system according to claim 1, wherein the length of the signal received from the drycleaning programmer is longer than the time interval set on the timer.

*5. An automatic control injection system according to claim 1, wherein the automatic reset timer contains a constant speed electric motor.*

*6. An automatic control injection system according to claim 2, wherein the automatic reset timer contains a constant speed electric motor.*

*7. An automatic control injection system according to claim 3, wherein the automatic reset timer contains a constant speed electric motor.*

*8. An automatic control injection system according to claim 4, wherein the automatic reset timer contains a constant speed electric motor.*

* * * * *